(12) United States Patent
King et al.

(10) Patent No.: US 7,801,845 B1
(45) Date of Patent: Sep. 21, 2010

(54) CREATING FORUMS ASSOCIATED WITH A SEARCH STRING

(75) Inventors: Joseph King, Seattle, WA (US); Waqas Ahmed, Bellevue, WA (US); Russell A. Dicker, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 375 days.

(21) Appl. No.: 11/963,773

(22) Filed: Dec. 21, 2007

(51) Int. Cl.
*G06F 17/00* (2006.01)
(52) U.S. Cl. ...................................... 707/608; 707/708
(58) Field of Classification Search ................ 707/608, 707/708
See application file for complete search history.

(56) References Cited

U.S. PATENT DOCUMENTS

| | | | | |
|---|---|---|---|---|
| 2001/0049616 A1* | 12/2001 | Khuzadi et al. | ................. | 705/8 |
| 2002/0059088 A1* | 5/2002 | Whalen et al. | ................. | 705/8 |
| 2003/0027121 A1* | 2/2003 | Grudnitski et al. | .......... | 434/308 |
| 2004/0111467 A1* | 6/2004 | Willis | .......... | 709/203 |
| 2008/0208975 A1* | 8/2008 | Olive | .......... | 709/205 |
| 2008/0287198 A1* | 11/2008 | Callery et al. | ................. | 463/42 |
| 2009/0307196 A1* | 12/2009 | Shuster | .......... | 707/3 |
| 2010/0030753 A1* | 2/2010 | Nad et al. | ....... | 707/3 |
| 2010/0070503 A1* | 3/2010 | Abraham | ..................... | 707/737 |

\* cited by examiner

*Primary Examiner*—James Trujillo
*Assistant Examiner*—William Spieler
(74) *Attorney, Agent, or Firm*—Lee & Hayes, PLLC

(57) ABSTRACT

Creation, association, and/or placement of search forums for searches strings enable users to discuss aspects of both searches and elements associated with the searches, and further enable the users to view discussions from other users. The search forum may be generated from variations of the search string. In addition or alternatively, search strings may be associated with existing item forums, category forums, and tag forums. Search forums may be placed with, for example, search results or with items, categories, and/or tags, among other possibilities, to provide user access to the search forums.

14 Claims, 9 Drawing Sheets

CREATING FORUMS ASSOCIATED WITH A SEARCH STRING

BACKGROUND

Unlike traditional brick-and-mortar businesses, companies utilizing e-commerce websites often do not have a physical store or location where a salesperson can help both novice and knowledgeable customers find sought-after products. Instead, a customer navigating an e-commerce website typically attempts to identify a product that meets the customer's needs. Even a customer with considerable experience navigating e-commerce websites sometimes experiences difficulty in choosing a product from among tens or hundreds of similar products. For novice customers, meanwhile, the task of shopping online via the web can be unproductive and even frustrating.

In response to these difficulties, these companies continually strive to make their e-commerce websites more dynamic, compelling, informative, and easier for users to navigate and locate products and related information. One way to improve a customer's experience includes providing forums (or discussion boards) that allow customers to exchange information with other people via dialogue in a discussion. The ever-enlarging product catalog makes forums helpful when a customer tries to distinguish between products, seek out impartial advice, learn more about a product or category, or obtain other information.

One way of creating forums is through selection of forum topics by an editor or administrator. However, this approach is inherently burdensome for an editor, particularly when the editor supports a large product catalog. For example, each forum may require manual creation and placement of the forum at useful locations throughout a website to provide adequate customer accessibility to the forums. A large product catalog may support tens of thousands of forums and thus require intensive manual interactions by an editor to maintain optimally placed forums within the website.

Accordingly, among other potential improvements, there remains a need to improve forum creation and placement on various types of websites.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
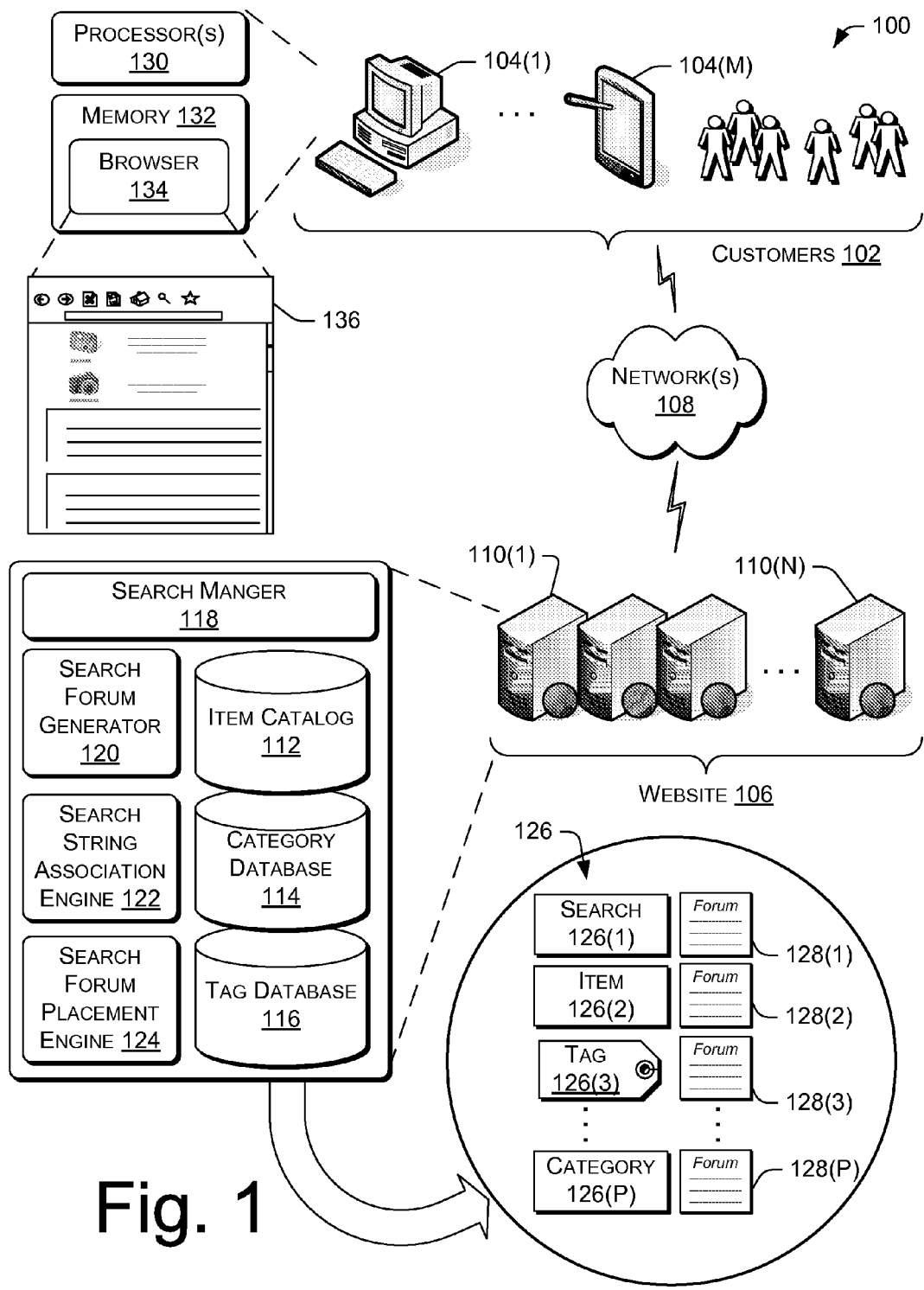
FIG. 1 illustrates an example architecture for implementing search forums associated with a search string used to query an electronic catalog of items. The architecture includes multiple clients coupled via a network to a server system that hosts the electronic catalog.

Embodiments of the present disclosure are directed to, among other things, forums associated with a search string. The search string may be used to locate particular elements which may be made remotely available, such as over a wide area network such as the Internet, or available by another distributed communication. As an overview, elements may include products, services, sellable units, user profiles, customer-created content (e.g., artwork), documents, or anything else to which a search may be used to locate.

The elements may be grouped or otherwise associated with one or more categories and/or tags. For example, an element may be a book under a category "science fiction novel" with a tag "sci-fi best seller." The book may be associated, either directly or indirectly, with other categories or tags.

For clarification, tagging enables a community of users or other entities to define and assign different tags to the elements. Tags are user-generated metadata about the elements. In other words, tags are pieces of information separate from, but related to, the elements. In a collaborative environment, the tags are descriptors that may be freely chosen by different users to characterize or otherwise describe attributes of the elements, rather than having the description controlled by a centralized classification process. The tags can specify properties of an element that may not otherwise be obvious from the element itself and/or which may have special meaning only to the user or a subset of users. Once assigned to elements, the tags may then be used to locate the elements, for example, via a tag search. Although embodiments are described as having alpha-numeric tags, other types of tags can be used, including icons, photos, and/or video clips, for example. In contrast, categories typically create a hierarchical organization of a catalog of elements and are often created and/or managed by an entity such as, but not limited to, an e-commerce website. It follows that elements, tags, and categories may be cross referenced to create a web of information in an electronic catalog.

Searching, meanwhile, enables a user to locate elements using a user-created search string (otherwise referred to as keywords, search terms, or the like), which is descriptive of elements that the user desires to locate. The search string may include one or more words or characters. In an example, a user may enter "mp3 player" into a search box when the user is searching for a device that plays mp3 files. A search engine may read the search string and retrieve elements that match one or more words in the search string. The retrieved elements may be presented in a search results web page. In some implementations, searching may use indexing to enhance the search results. Besides returning elements, search terms may also retrieve categories and/or tags associated with the search string. In addition, search strings may be modified or transformed to enable searching for variations of the search strings. For example, synonyms may be included in a search and misspellings may be corrected before a search is conducted by the search engine.

The search result web page may further include a search forum (i.e., a forum associated with the search string used to generate the search result). A forum is an online discussion board where users may exchange messages (usually text-based) via posts or entries, typically continued in a dialogue format on the message board. In some instances, the forum may facilitate exchanging and viewing images (e.g., videos, icons, or other graphical imagery) or exchanging and/or playing audio and/or video clips. Users may either contribute to the discussion or they may read other users' entries to gain insight on the discussion topic. The search forum may be presented with an associated search result web page to display the search forum and allow users to interact on the search forum. In some aspects, users may exchange files or other data via a forum, either using a message board or other response-posting environment.

The search forum may include one or more discussions. Each discussion may be created, in whole or in part, based on topics related to the element and the particular search associated with the element. As a result, the discussions may be related to aspects of the search string, including the elements associated with the search string. Therefore, the search forum may be a general forum for discussing an array of elements, each sharing a common search string. A search forum may allow users to participate in general discussions related to the search string without being limited to traditional item categories or item pages.

In other embodiments, the search forums may surface on element, tag, or category web pages, or other website addresses within an electronic catalog. For example a search string may have a strong association with a particular element, thus it may be desirable to place a hyperlink to the search forum on the element web page. In further embodiments, search forums may be selectively placed throughout an electronic catalog website (automatically or by an administrator) to strategically allow customers to access forums that may pertain to their interests while avoiding over-placement of the search forums which may clutter websites and distract customers from more relevant information or services.

For purposes of discussion, search forums are described in the context of an item catalog hosted by a merchant website. One illustrative implementation of this context is provided below. However, it should be appreciated that the described search forum generation and placement techniques may be implemented in other contexts. For example, instead of items in an electronic catalog, the elements could be social profiles, news articles, photos, documents, web sites, among other examples of items that might generate forum discussions. The elements could even be an abstract topic, such as "history" or "modern art". The described techniques can be used within any context that implements a search engine to discover related content. Moreover, other search forum generation and placement techniques may be performed by the illustrated architecture.

Illustrative System Architecture

FIG. 1 illustrates an example architecture 100 for implementing search forums associated with a search string used to query an electronic catalog of items. In the architecture 100, the customers 102 may utilize user computing devices 104(1), . . . , 104(M) to access a website 106 via a network 108. The network 108 represents any one or combination of multiple different types of networks, such as cable networks, the Internet, and wireless networks.

One or more servers 110(1), . . . , 110(N), perhaps arranged in a cluster or as a server farm, host the website 106 or another type of information server. Other server architectures may also be used to host the website 106. The website 106 is capable of handling requests from many users and serving, in response, various web pages that can be rendered at the user computing devices 104(1)-(M). The website 106 can be any type of website that supports user interaction, including online retailers, informational sites, social networking sites, blog sites, search engine sites, news and entertainment sites, and so forth.

In the illustrative environment, the website 106 represents a merchant website that hosts an electronic catalog with one or more items. It will be appreciated that, although website 106 is described in the context of an e-commerce or merchant website, the described embodiments could be implemented in any environment that includes a search function for content. Indeed, the search function could be implemented for content that is ultimately located on other remote systems. However, according to the illustrative embodiment, an item includes anything that the merchant wishes to offer for purchase, rental, subscription, viewing or some other form of consumption. In some embodiments the item may be offered for consumption by the merchant. However, in some embodiments the merchant may host items that others are selling using the merchant's website. An item can include a product, a service, a digital download, a news clip, a user profile, customer-created content, information, or some other type of sellable or non-sellable unit.

In FIG. 1, the electronic catalog is represented as an item catalog 112, which stores a collection of item records. The item catalog 112 is accessible, directly or indirectly, by one or more of the servers 110(1)-(N). Each item record, meanwhile, represents an associated item being offered for sale or other consumption on the website 106 and contains information about the associated item. For products such as books or music CDs, for example, the item record may contain a description, images of the product, author/artist names, publication data, pricing, shipping information, and so forth. For other types of items, the item record may contain different information appropriate for those items.

The electronic catalog may further include a category database 114 and a tag database 116 associated with the item catalog 112. The category database 114 may include categories which form a hierarchical structure for associating items in the electronic catalog. The tag database may include tags associated with items in the item catalog. Therefore, an association exists between items in the item catalog 112, categories in the category database 114, and tags in the tag database 116.

A search manager 118 facilitates access to the item records in the item catalog 112. In some implementations, the search manager 118 enables direct and/or indirect access to categories in the category database 114 and tags in the tag database 116. When a user initiates a search by submitting a search string to the website 106, one or more of the servers 110(1)-(N) retrieve the items from the item catalog 112 that are associated with the search string and serve a web page containing search results. The item catalog 112 may contain static web pages that are pre-generated and stored prior to such requests, and/or data that is used to populate dynamic web pages that are generated in response to such requests.

FIG. 1 also depicts a search forum generator 120, which generates search forums for a search string. In addition, a search string association engine 122 creates relationships between the search strings and other items, categories, and/or tags, thereby linking a search string to existing forums for other items, categories, and/or tags. For clarity, any forum generated and/or associated with a search string is referred to as a search forum. A search forum placement engine 124 may be used to place the search forums throughout the website 106 after they have been generated by the search forum generator 120 or associated to the search string by the search string association engine 122. To generate, associate, and place search forums, the search forum generator 120, the search string association engine 122, and search forum placement engine 124 may utilize many factors, either individually or in any combination, some of which may indicate the relevance of a search forum to a respective search string or item.

A search string may be used to generate a search result web page that includes search results 126. The search results 126 may include a search term 126(1) including one or more words and/or characters in the search string. In addition, the search results may include an item 126(2), a tag 126(3), and/or a category 126(P), among other possible search results.

Each of the search results 126(1)-(P) may itself include or otherwise correspond to a respective one (or more) of the search forums 128(1), ..., (P). The search forums 128(1)-(P) may include a discussion related to the search term, the item, the tag, or the category associated with the search string. The search forums 128(1)-(P) may be strategically placed (or hyperlinked) throughout the website 106. For example, the search forums 128(1)-(P) may be accessible from the corresponding search results web page. In addition, the search forums may be placed on some or all of the item, category, or tag web pages associated with the search string.

In particular, the search forums 128(1)-(P) may be generated and/or placed by algorithms utilizing aspects of user input, search string creation, or other aspects related to search strings or associated items, categories, and/or tags, thereby permitting automatic, or partially automatic, forum generation and/or placement within the website 106. Some factors that assist in generating and placing the search forums 128(1)-(P) may be based in part on frequency of the search string and resulting activity on the website 106 (e.g., click through activity by a user, purchase history, whether the user used the forum, etc.), while other factors may not rely on the frequency of the search string and resulting website activity. Whatever factors lead to their compilation, each of the search forums 128(1)-(P) may be helpful to provide users additional information relating to the respective search results 126(1)-(P).

For instance, if a user searches within the item catalog for item records associated with the search term 126(1) (e.g., "digital camera"), the user may be directed to a search result web page that includes the search forum 128(1) which allows users to post comments, ask questions, or otherwise share information related to the associated search term. FIGS. 2-7 and the accompanying discussion illustrate an example of search forum generation, association, placement, and presentation within an item catalog hosted by a merchant website.

As discussed above, one or more of the customers 102 may search for items associated with a particular search string (e.g., the search term 126(1)) by conducting a search on the website 106. To search, the customers 102 may utilize the user computing devices 104(1)-(M) (also referred to as "client computers" or simply "clients"). The user computing devices 104(1)-(M) may be implemented as any number of computing devices, including as a personal computer, a laptop computer, a portable digital assistant (PDA), a mobile phone, a set-top box, a game console, and so forth. As illustrated, each user computing device is equipped with one or more processors 130 and memory 132 to store applications and data. According to some embodiments, a browser application 134 is shown stored in the memory 132 and executes on the processor 130 to provide access to the website 106. The browser 134 renders web pages served by the website 106 on an associated display. Although embodiments are described in the context of a web based system, other types of client/server-based communications and associated application logic could be used (e.g., a cable-tv head-end and television set-top box environment, a digital video recorder with corresponding remote service provider, among other possibilities).

When a user (e.g., one of the customers 102) accesses the website 106, the user computing device 104(1) submits a request, such as in the form of a uniform resource locator (URL), to the servers 110(1)-(N). Upon receiving the request, the servers 110(1)-(N) return a web page 136 back to the requesting client computer. In the context of a merchant website, the returned web page 136 may allow the user to view or join a particular search forum (e.g., a "camera" search forum) to post or read information relevant to the associated search. The user may join the forum from a search result web page or, in some instances, directly from an item web page associated with a particular search.

Figure 2:
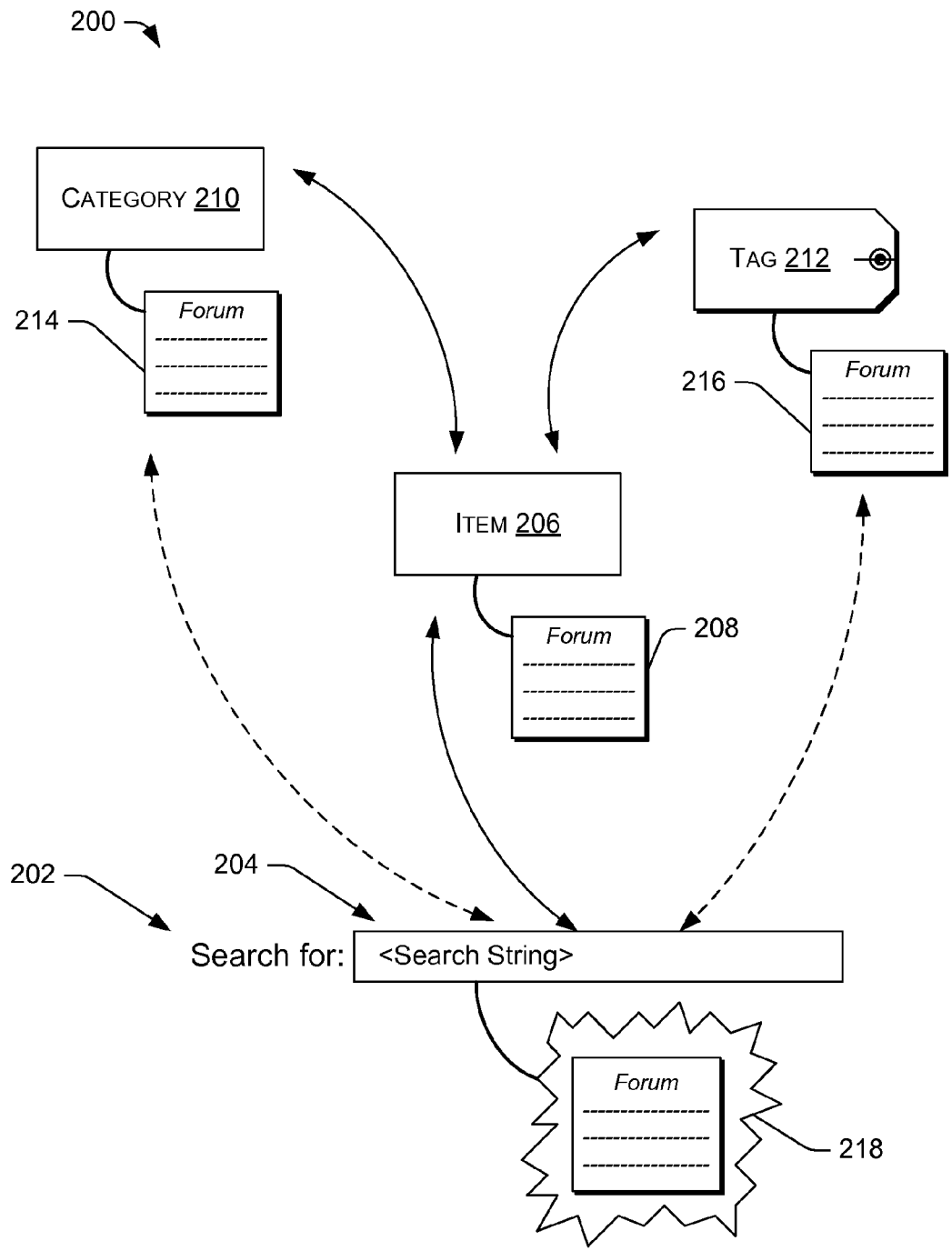
FIG. 2 is an illustrative relational diagram between a search string, categories, tags, and items in accordance with an embodiment of the disclosure.

FIG. 2 is an illustrative relational diagram 200 between a search string, categories, tags, and items in accordance with an embodiment of the disclosure. In an embodiment, a search string field 202 may enable a user to enter a search string 204 on a web page, such as web page 136, to search for one or more items (e.g., item 206) in an electronic catalog. The item 206 is associated with an item forum 208 which relates to the item 206. For example, the item may be an Ipod® mp3 player and the item forum may be an Ipod® mp3 player forum that allows users to exchange messages related to the item.

In some implementations, the search string 204 may be used to create search results that include one or more categories (e.g., category 210) and/or one or more tags (e.g., tag 212). In one implementation, the search string may be used to retrieve the item 206 which is then associated by the search manager 118 with the category 210 and/or the tag 212, therefore expanding the search results with the category and/or the tag. For example, the item may be an Ipod® mp3 player while the category is "mp3 player" and the tag is "apple."

In another implementation, the search string may be used to directly retrieve categories and/or tags associated with the search string. The category 210 may include an associated category forum 214 while the tag 212 may include an associated tag forum 216. The various forums associated with the item, the category, and the tag are collectively referred to as search forums.

In addition, the search string 204 may generate a search forum 218 without reference to the item, the category, and/or the tag. For example, the search string may be used to generate the search forum 218 after the search string has been used a predetermined number of times by the users of the website 106. For clarity, search forums include forums that are associated to the search string from the search results, such as the item forum 208, the category forum 214, and the tag forum 216, while search forums also include search forums generated directly from the search string 204. Further details about search forum creation are discussed in the subsequent section.

Search Forum Creation

Figure 3:
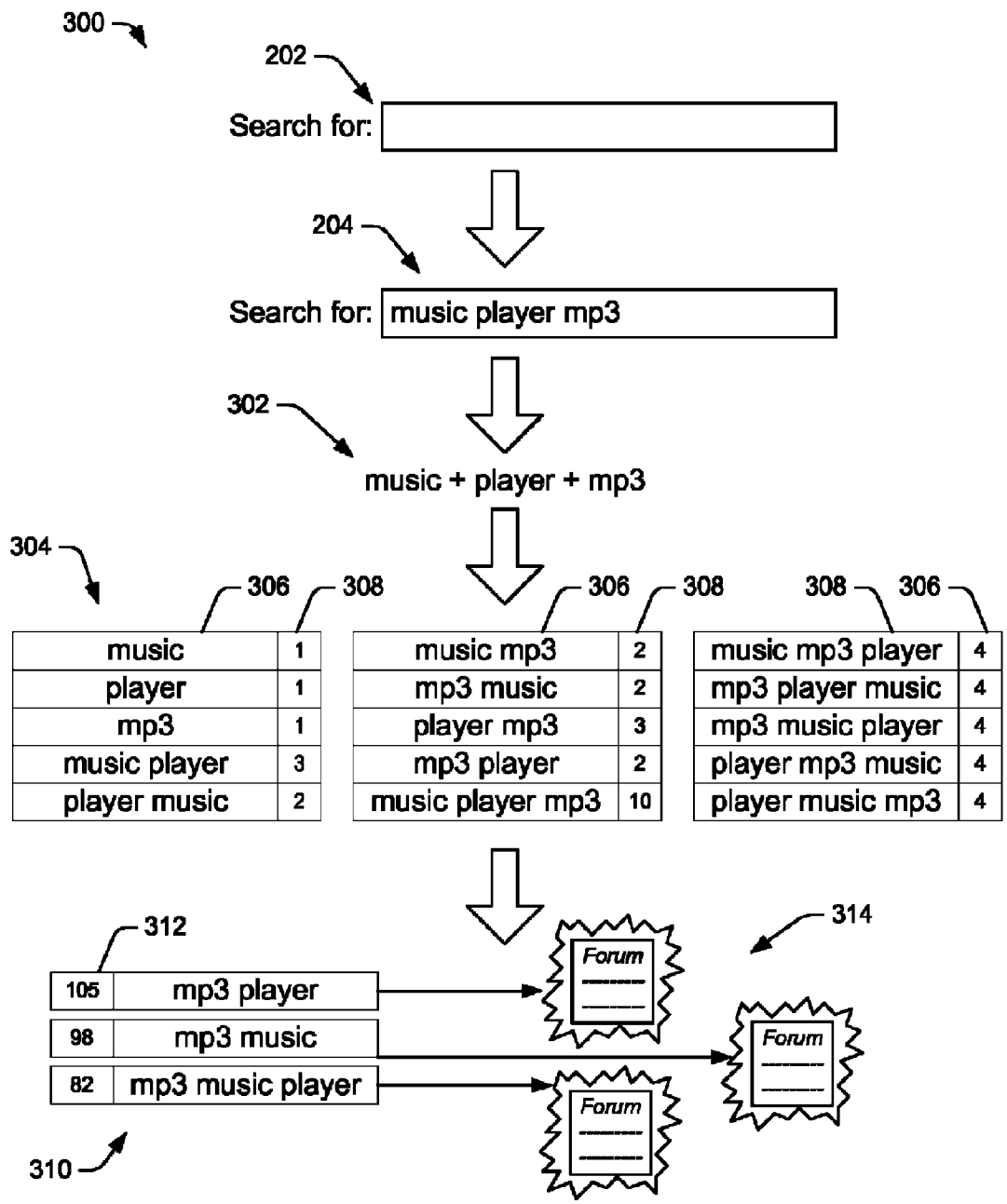
FIG. 3 is an illustrative flow diagram for generating search forums from a search string.

FIG. 3 is an illustrative flow diagram 300 for generating search forums from a search string. The search string field 202 is populated with the search string 204, such as "music player mp3." Next, the search string 204 is analyzed at 302 to determine individual search terms included in the search string, if any. Here, the search string includes three search terms including "music," "player," and "mp3."

The search terms may be converted into a variation log 304 to include any variations of the search terms. In some instances, the variations may include synonyms or alternative (or corrected) spellings of a search term. In addition, the variations may include a reorder of the search terms, including different combinations of the search terms. Each variation 306 may include a weight 308 associated with the variation. For example, a variation that is similar to the search string may include a relatively larger weight while obscure variations of the search string may include a relatively small weight. The weight 308 may be used to determine which search term variations are selected to generate search forums.

At 310, the search term variations and their respective weights are aggregated to create a variation aggregate score 312. If the variation aggregate score 312 reaches a predetermined threshold score, then a search forum 314 may be generated for the particular search term variation. In some instances, the variation "mp3 player" may be associated with a number of original search strings 204 other than "mp3 player," such as "music player," "mp3 recorder," "mp3 walkman," or the like. Each of original search strings may then generate the variations 304, some of which may include "mp3 player" having an associated weight 308. While the illustrated embodiment describes generating a forum when a threshold score is reached, other embodiments may merely generate a set number of forums. For instance, other embodiments may create forums corresponding to the top five variation aggregate scores 312, and so forth.

Figure 4:
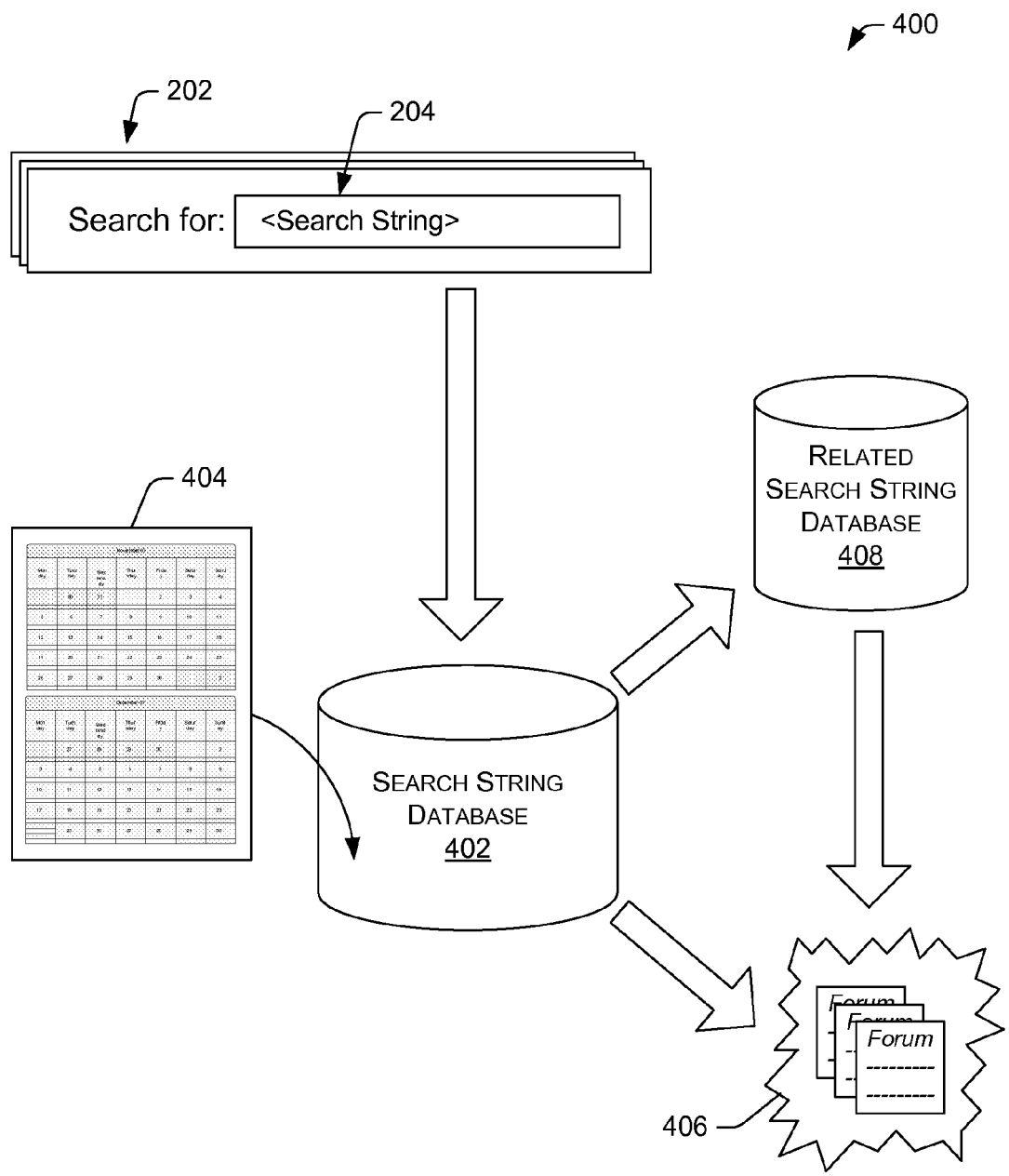
FIG. 4 illustrates an example architecture for generating a search forum from a search string.

FIG. 4 illustrates an example architecture 400 for generating a search forum from a search string. The architecture 400 includes the search string field 202 and the search string 204. In some embodiments, the search string 204 is stored in a search string database 402. The search string database includes an archive of search strings including calendar information 404 related to the search string. For example, the search string database 402 may include a record indicated that a user entered the search string "mp3 player" at 2:34 pm EST on Nov. 23, 2007. The search string database, therefore, may be datamined or otherwise analyzed to determine the popularity of search string, or variations of search string, to create search forums 406. In additional, a related search string database 408 may provide variations of search strings, therefore increasing the number of search terms variations. The related search string database 408 may be populated by associating refinement searches by the same user (otherwise known as a focus search), by editor search associations, or by other associations. Therefore, the related search string database may also be used to create search forums 406.

In some embodiments, the search forums 406 generated by the search string database 402 and/or the related search string database 408 may be based (in whole or in part) on the calendar information 404. For example, the most popular search strings for a particular time period (e.g., week, month, etc.) may be used to generate the search forums 406. This may enable a website administrator to present popular search forums on the website 106 while removing or discontinuing outdated or otherwise obsolete search forums.

Search Forum Placement

Figure 5:
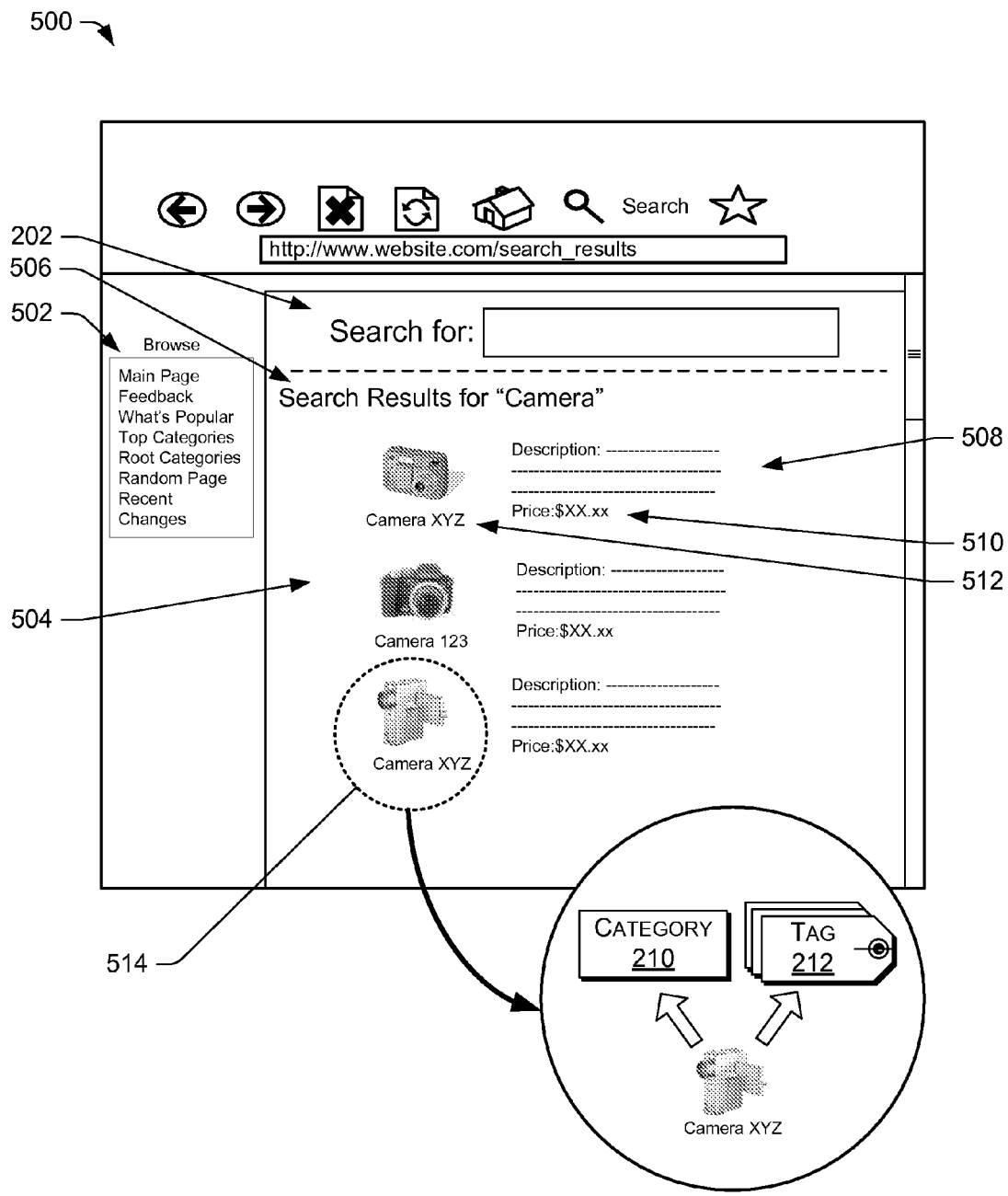
FIG. 5 is an illustrative screen rendering of a search result web page depicting a relationship between a product, a tag, and a category.

FIG. 5 is an illustrative screen rendering of a search result web page 500 depicting a relationship between a product, a tag, and a category. The web page 500 may include any number of navigation links 502 in a first portion of the web page. A second portion of the web page may facilitate searching for items and may include the search string field 202.

In an embodiment, the web page 500 may include a list of items 504 returned from a search string 506. For example, the search string 506 may be "camera" and may return the list of items 504. The list of items 504 may include a description 508, a price 510, and an image and link 512 for each item. Other embodiments may include more or less than the illustrated information.

Further, each item, such as an item 514, may include additional information including at least one associated category 210 and at least one associated tag 212. In some instances, the item 514 may include multiple category designations and/or multiple tag designations. For example, a popular item may be tagged with many tags that are descriptive of the item. Each tag may include information related to the popularity of the tag in association to the item. For example, the item may be tagged many times with the same tag to create a high tagging number (or quantity), whereas other tags associated with the item may include a lower tagging number.

Search forums may be surfaced with search results, items, tags, and/or categories. In an embodiment, the tag number may determine whether the search forum is surfaced with the tag. Additionally or alternatively, the tag number may determine whether a tag forum associated with the tag is further associated with a search string.

In yet another embodiment, a click through (i.e., user activity) of a user may be analyzed after the user receives search results returned from the search string. For example, a user may select the third item listed in the search results for a particular search string. This item, or its associated category and/or tags may be matched with the search string for association of forums with the search string. In addition, the click through selections from a user may be used to surface a search forum with items, categories, and/or tags.

Figure 6:
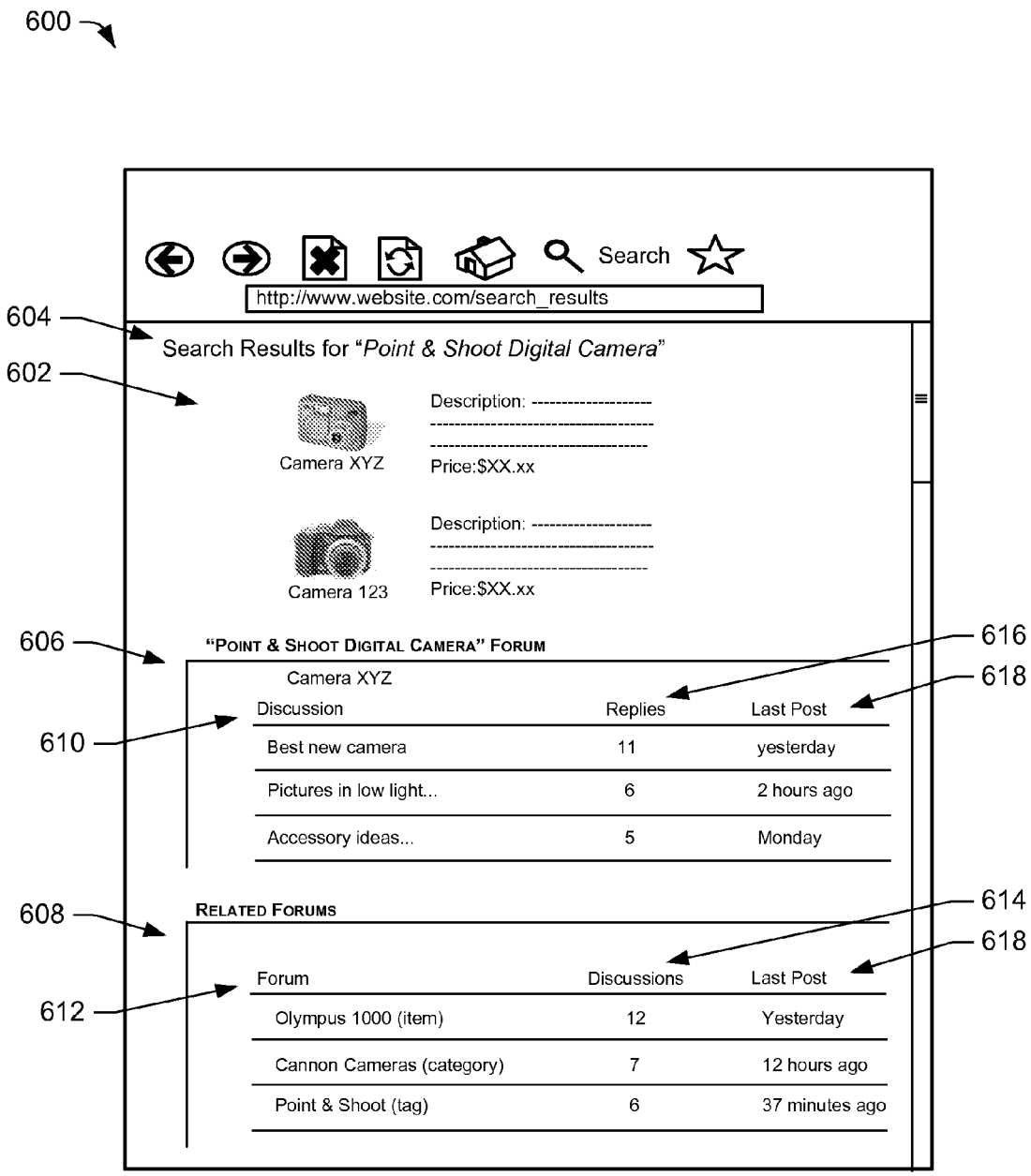
FIG. 6 illustrates an example screen rendering of a search result web page including a search forum and related forums.

FIG. 6 illustrates an example screen rendering of a search result web page 600 including a search forum and related forums. The search result web page 600 may include search results 602 for a search string 604. In addition, the search result web page 600 may include a search forum 606 and related forums 608. The search forum 606 generally includes discussions 610 that relate directly to the search string used to generate the search result web page 600. In contrast, the related forums 608 may include item forums, category forums, and/or tag forums related to the search results 602. For example, the related forums may include a forum for an item in the search results, a forum for a category represented by the search results, and/or a forum for a tag represented by or associated with the search results, among other forums.

For instance, a discussion in the search forum 606 may include "best new camera" which includes dialogue from users about the best new camera related to the point and shoot digital camera search string. In contrast, a discussion in the related forums 608 may include a discussion on a particular model of a camera which is listed in the search results 602, a category of an item listed in the search results, and/or a tag associated with an item listed in the search results.

As shown in FIG. 6, the related forums 608 may list forums 612 and provide a hyperlink to the forum discussions 614. If one of the forums 612 is selected, the user may have access to a variety of discussions within the selected forum. As illustrated in FIG. 6, the forum "Point & Shoot" may include six discussions. The search forums 606 may display the number of replies 616 to inform the user of the discussion's overall activity. In addition, other related information such as the last post 618 may be identified to further inform users about the discussion's activity. In some instances, the forums 612 listed in the related forums 608 may be arranged based on the number of discussions in the forum. For example, the forums that include the greatest number of discussions may be placed at the top of the list of the related forums 608.

Figure 7:
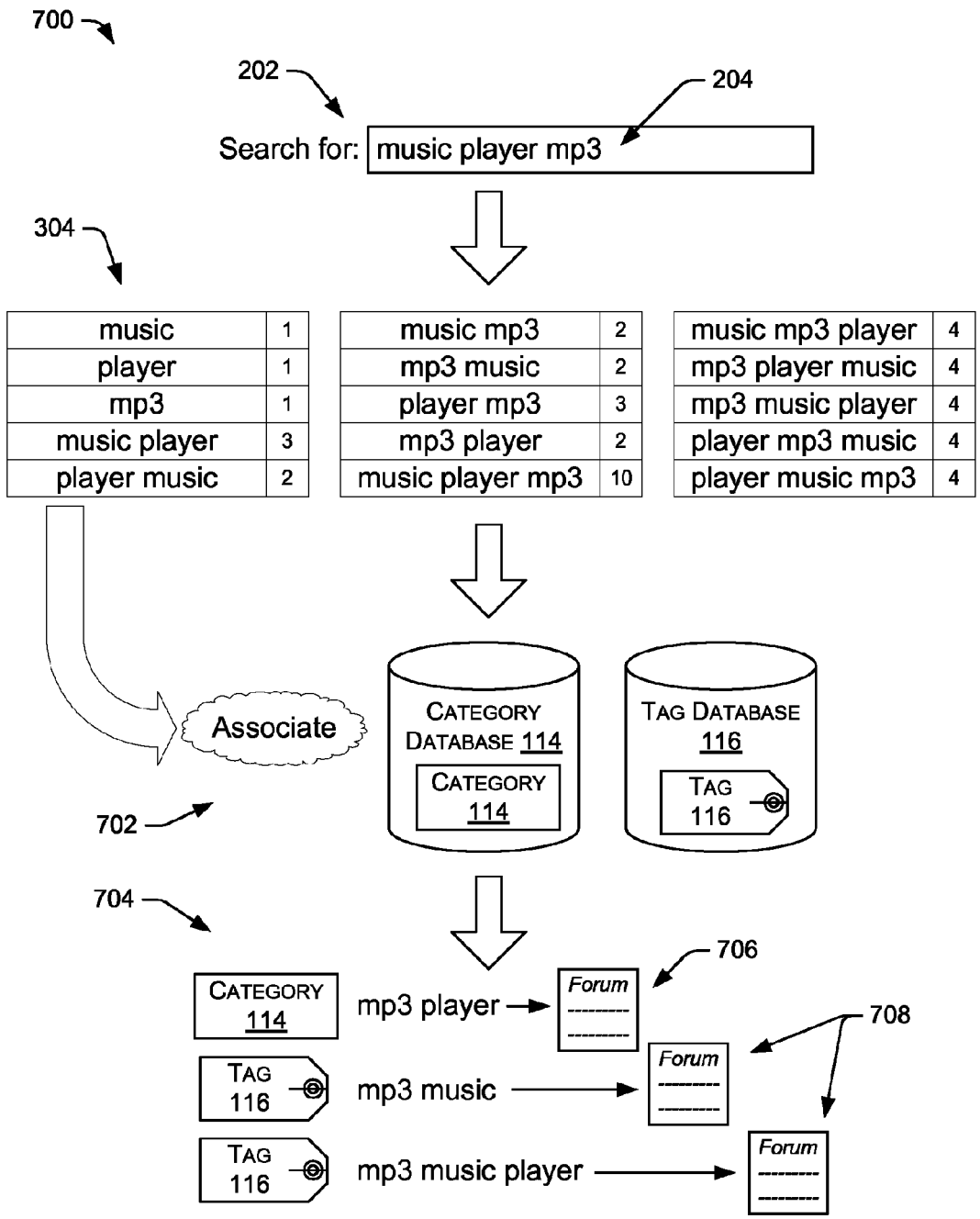
FIG. 7 is an illustrative flow diagram for associating a search string with a category and/or a tag to associate forums with the search string.

FIG. 7 is an illustrative flow diagram of another embodiment of a process 700 for associating a search string with a category and/or a tag to associate forums with the search string. The process 700 includes the search string field 202 and the search string 204 which are used to generate the variation log 304 as described with reference to FIG. 3.

In an embodiment, the variation log 304 is associated with the category database 114 and/or the tag database 116 at 702 to match a variation of the search string to a category and/or tag name. For example, the search string "music player mp3" may include the variations "mp3 player," "mp3 music," and "mp3 music player," each matching existing category and/or tag names. At 704, the category "mp3 player" and its corresponding category forum 706 may be associated with the search string. Similarly, the tag "mp3 music" and "mp3 music player" and their corresponding forums 708 may be associated with the search string. These forums may surface on a search results page that is generated from the search string "music player mp3." In an implementation, associating the search string to a tag or a category, and thus a tag forum and/or category forum enables merging of search forums with other forums, thereby reducing repetitive forums while maintaining a desired presence of forums.

Search Manager and Search Forum Implementation

Figure 8:
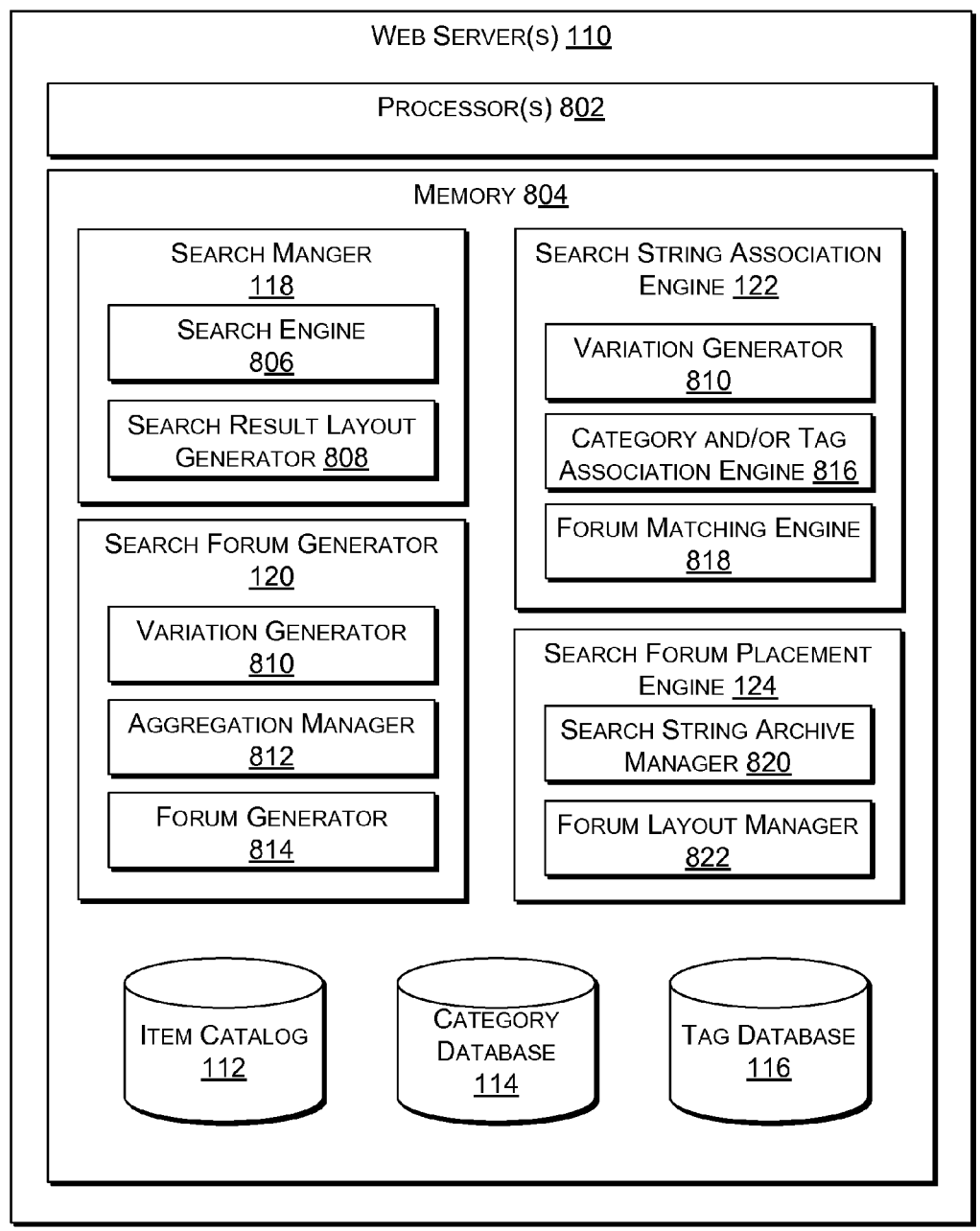
FIG. 8 is a block diagram illustrating embodiments of modules in a search manager, search forum generator, search string association engine, and search forum placement engine from FIG. 1.

FIG. 8 illustrates an example implementation 800 of the search manager 118, the search forum generator 120, the search string association engine 122, and the search forum placement engine 124 that are run as software on one or more of the web servers 110(1)-(N). The web servers have processing capabilities and memory suitable to store and execute computer-executable instructions. In this example, the web server(s) 110 include one or more processors 802 and memory 804. The memory 804 may include volatile and/or nonvolatile memory, removable and/or non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

The search manager 118, the search forum generator 120, the search string association engine 122, and the search forum placement engine 124 are implemented as software or computer-executable instructions stored in the memory 804 and executed by one or more of the processors 802. The search manager 118 includes a search engine 806 for retrieving items from the item catalog 112 associated with a search string, such as the search string 204. In some embodiments, the search engine 806 may retrieve categories and/or tags that are related to a search string. This may enable a user to explore an entire category and/or a tag to find other related items or information. In addition, the search manager 118 includes a search result layout generator 808 for presenting the search results produced by the search engine 806. The search results layout generator 808 may create a structured layout for any items, categories, and/or tags that are returned from a search result for presentation to the user on a web page, such as the search result web page 600 in FIG. 6.

The search forum generator 120 may include a number of modules. In an embodiment, the search forum generator 120 includes a variation generator 810 for creating a variation log 304. The variation generator 810 may use variations of the search string 204 to create the variation log 304. In addition, the variation generator may use information from other libraries, such as a dictionary or word library, as alternative (or corrected) spelling arrangements for search terms, synonyms, or other variations of the search terms to create the variation log 304. The variation generator may also assign the weight 308 to each variation. The weight may be assigned based on the relationship between the variation and the original search string. For example, if the variation is similar to the original search string, then a larger weight may be assigned to the variation than if the variation is not similar to the original search string. Therefore, obscure variations may be given less weight than variations that are very similar or identical to the search string.

In addition, the search forum generator 120 may include an aggregation manager 812 for aggregating the weight 308 to create the variation aggregate score 312. The aggregate score 312 may be used by a forum generator 814 to create a search forum when the aggregate score reaches a predetermined threshold value that triggers the creation of the search forum, for example.

The search string association engine 122 may also include a number of modules. In an embodiment, the search string association engine 122 includes the variation generator 810 discussed above for creating a variation log 304. In addition, the search string association engine 122 may include a category and/or tag association engine 816 for associating the search string to categories and/or tags. For example, a variation of the search string, as included in the variation log 304, may match an established category from the category database 114 or tag from the tag database 116. In such instances, the search string may be associated with the established category and/or tag and to the corresponding category forum and/or tag forum. A forum matching engine 818 may be used to match the category forum and/or tag forum to the search string.

The search forum placement engine 124 may include modules for facilitating the placement and organization of search forums on the website 106. In an embodiment, the search forum placement engine 124 may include a search string archive manager 820 that is configured to manage a search string archive, such as the search string database 402 in FIG. 4. The search string archive manager 820 may enable presentation of search forums (including category forums and/or tag forums) based on the popularity, frequency, or otherwise based on use of the search string over a given period of time. For example, when a search string is popular (e.g., commonly used on the website 106), the search string archive manager may determine that search forums associated with the popular search string should surface on the search result web page 600, a tag page, a category page, and/or other appropriate locations within the website 106.

A forum layout manager 822, meanwhile, may configure the search forums for presentation on the search result web page 600. For example, the forum layout manager 822 may present forums derived directly from the search string in a search forum portion of the search result web page, while presenting forums originating from a category and/or a tag in a second "related forums" portion of the search result web page.

Operation

Figure 9:
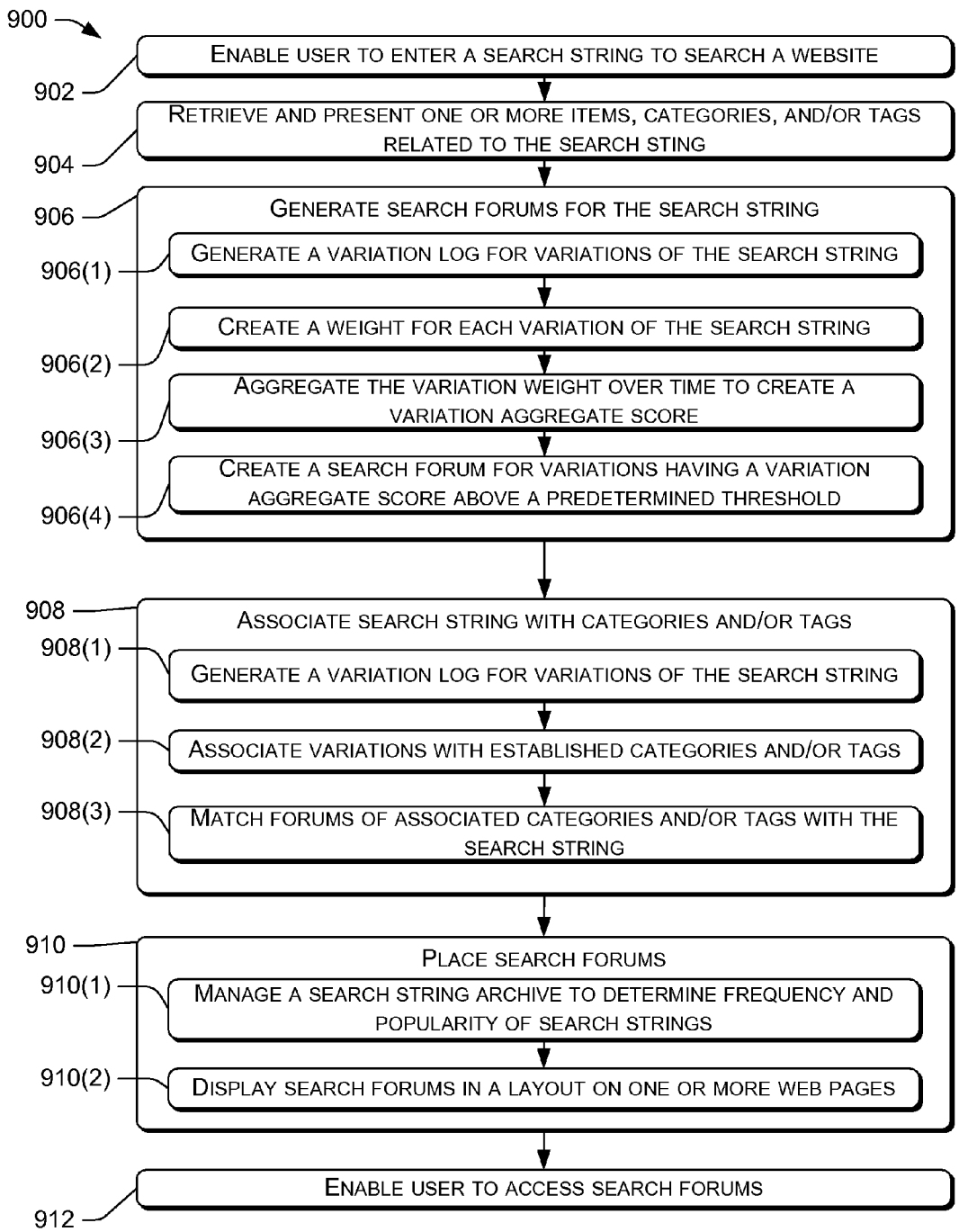
FIG. 9 is a flow diagram of an embodiment of a process for creating search forums from a particular search string and placing the search forums on an electronic catalog website.

FIG. 9 is a flow diagram of an embodiment of a process 900 for creating search forums from a particular search string and placing the search forums on an electronic catalog website 106. The process 900 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 900 is described with reference to the architecture 100 of FIG. 1, as well as the search manager 118, the search forum generator 120, the search string association engine 122, and the search forum placement engine 124 of FIGS. 1 and 8.

The process 900 enables a user (e.g., one of the customers 102) to enter a search string at 902 to search a website, such as website 106, for items or the like. At 904, the search engine 806 retrieves matching results, including items, categories, and/or tags. The search result layout generator 808 included in the search manager 118 presents the search results for viewing by the user.

Next, FIG. 9 depicts that an operation 906 generates search forums for the search strings, and includes a series of sub-operations 906(1), ..., (4). At 906(1), the variation generator analyzes the search string to create a variation log of search terms related to the search string. In addition, each variation may be assigned a weight at 906(2). At 906(3), the aggregation manager 812 may aggregate the weights for each variation to create a variation aggregate score. The aggregation typically occurs after multiple search terms are processed in a variation log, such as the variation log 304. The forum generator 814 may create a search forum when the variation aggregate score reaches a predetermined threshold level at 906(4). The predetermined threshold level may be a quantity or a percent of all the variations. For example, the top three search variations may be used to create forums in a first implementation. In a second implementation, variations with a variation aggregate score above a fixed or variable threshold may be used to create search forums.

Next, an Operation 908 may associate search strings with categories and/or tags to determine category forums and/or tag forums associated with the search strings, and includes a series of sub-operations 908(1), ..., (3). The variation generator 810 may generate a variation log for variations of the search string at 908(1), similar to the process described above at 906(1). Next, the category and/or tag association engine 816 may associate variations with established categories and/or tags at 908(2). At 908(3), the forum matching engine 818 may match forums of associated categories and/or tags with the search string.

The search forum placement engine 124 may place search forums during an operation 910 having sub-operations 910(1) and 910(2). At 910(2), the search string archive manager 820 may manage a search string archive to determine a frequency and popularity of search strings. The search string archive manager 820 may determine a quantity for each search string (and variations) for a preselected or variable time frame. This enables adding and deleting search forums based on frequency or popularity of search strings over time. At 910(2), the forum layout manager 822 causes a display of search forums in a layout on one or more web pages, such as the search result web page 600. In addition or alternatively, the forum layout manager 822 may surface the search forums on item web pages, tag web pages, and/or category web pages. A user is enabled to access the search forums, typically via a link, at 912.

By presenting the search forums to the user based on the process 900 including generating, associating, and placing the search forums, the relevant and popular search forums may be dynamically presented to users of website 106. For example, the search forum may always be placed on a search result web page 600, while only well-correlated items, categories, and/or tags associated with the search string will also include user access to the search forum. Among other potential benefits, this approach to search forum generation, association, and placement may provide adequate access to search forums while avoiding the cluttering of item web pages. Further, this process may remove the need for an editor to manually monitor search forums for either creation or removal of the search forums from web pages within a website. Users may, therefore, efficiently and effectively use search forums to learn more about specific items and make educated decisions related to the items.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method of managing forums, the method comprising:
    receiving a search string for searching an electronic catalog of items, the search string including a plurality of search terms;
    identifying items associated with the search string to create a search result;
    generating variations of the search string, the variations including a modified arrangement of the plurality of search terms that form the search string;
    determining whether a forum associated with the search string or with one of the variations of the search string exists b determining if the search string or one of the variations of the search string is associated with at least one of a tag having a tag forum, a category having a category forum, or an existing search term having a search forum;
    at least partly in response to determining that a forum associated with the search string or one of the variations exists, selecting a forum from at least one of the tag forum, the category forum, or the search forum;
    at least partly in response to determining that a forum associated with the search string or one of the variations does not exist, creating the forum by logging each variation with an associated weight, the weight being aggregated for each occurrence of the variation to create a variation aggregate score, the forum being created for the variation when the variation aggregate score reaches a threshold value; and
    causing a display of the selected or created forum as a part of the search result.

2. The method as recited in claim 1, wherein generating variations of the search string includes at least one of replacing one of the plurality of search terms with an alternatively spelled search term or replacing one of the plurality of search terms with a synonym of the search term.

3. A method comprising:
obtaining a search string of at least one search term, the search string to facilitate retrieving elements in a search result that are related to at least one of the search terms; and
generating a search forum based on the at least one search term included in the search string, the generating to include:
creating a plurality of variations of the search string, each of the plurality of variations including at least one search term and a weight;
aggregating the weights for each variation to create a variation aggregate score; and
creating the search forum for variations when the associated variation aggregate score reaches a threshold value.

4. The method as recited in claim 3, further comprising surfacing the search forum with the search result.

5. The method as recited in claim 3, wherein generating the search forum based on the at least one search term includes selecting the search string from multiple search strings generated within a predetermined time period, the multiple search strings having a usage count during the predetermined time period that reaches a predetermined usage threshold.

6. The method as recited in claim 5, further comprising associating the plurality of variations with at least one of a tag having a tag forum or a category having a category forum, each of the associated tag forums and category forums being surfaced with the search result.

7. The method as recited in claim 3, further comprising surfacing the search forum with at least a tag or a category related to the search string.

8. The method as recited in claim 4, wherein surfacing the search forum with the search result includes surfacing the search forum with a related search string, the related search string including at least one common search term with the search string.

9. One or more computer-readable media storing computer-executable instructions that, when executed on one or more processors, performs acts comprising:
creating variations of a search string, each variation having a weight corresponding to a similarity between the variation and the search string;
creating a search forum from at least one of the variations, the creating to include:
aggregating the weights of each variation to create an aggregate weight associated with the variation; and
determining when the aggregate weight associated with the variation reaches a threshold value; and
causing the display of the search forum.

10. The one or more computer-readable media as recited in claim 9, wherein the search forum is placed on a website hosting an electronic catalog of items.

11. The one or more computer-readable media as recited in claim 9, further comprising:
associating the variation with at least one of a tag having a tag forum or a category having a category forum;
creating a related forum for each of the associated tag forum and the associated category forums; and
causing the display of the related forum proximate the search forum.

12. The one or more computer-readable media as recited in claim 9, further comprising:
selecting an item from search results associated with the search string, the item having a category and at least one tag;
selecting at least one of a category forum associated with the category or a tag forum associated with the tag; and
causing the display of the category forum or the tag forum proximate the search forum.

13. The one or more computer-readable media as recited in claim 12, wherein selecting a tag forum includes selecting the tag forum associated with a tag having a highest tag score.

14. The one or more computer-readable media as recited in claim 12, wherein selecting an item includes selecting the item by determining a click through of users for the search string.

* * * * *